W. T. KIRKMAN.
GARBAGE CAN COVER.
APPLICATION FILED JUNE 19, 1911.

1,043,774.                                      Patented Nov. 5, 1912.

Witnesses:

Inventor:
Wilbert T. Kirkman

UNITED STATES PATENT OFFICE.

WILBERT T. KIRKMAN, OF SEATTLE, WASHINGTON, ASSIGNOR OF ONE-HALF TO JOHN E. STEVENS, OF SEATTLE, WASHINGTON.

GARBAGE-CAN COVER.

1,043,774.  Specification of Letters Patent.  Patented Nov. 5, 1912.

Application filed June 19, 1911. Serial No. 634,032.

*To all whom it may concern:*

Be it known that I, WILBERT T. KIRKMAN, a citizen of the United States, residing at Seattle, in the county of King and State of Washington, have invented a new and useful Improvement in Garbage-Can Covers, of which the following is a specification.

The object of my invention is to provide a cover for garbage or other refuse cans having improved, simple and highly efficient means for insuring the extermination of flies, and other bacteria-carrying insects, thus preventing the spread of disease.

The invention will be hereinafter fully set forth and particularly pointed out in the claim.

Figure 1:
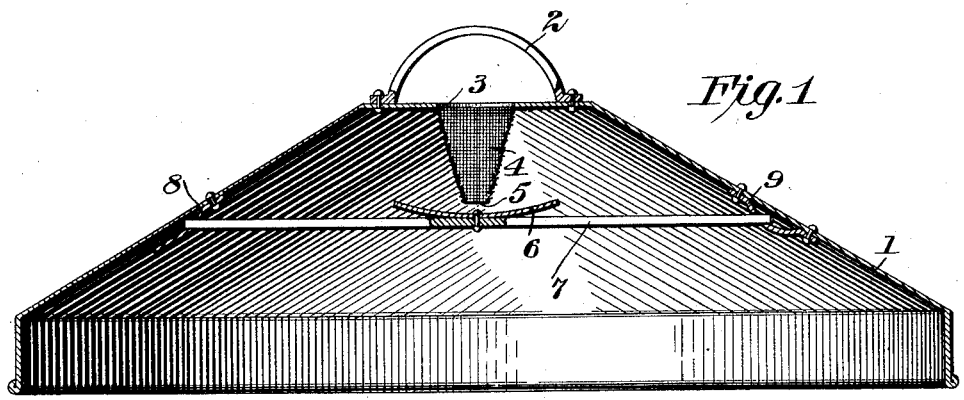
Figure 2:
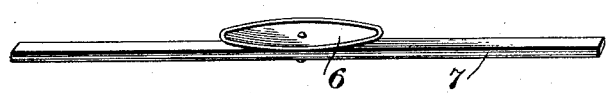

In the accompanying drawings, Figure 1 is a side view of my improved can cover, and Fig. 2 is a detail.

Referring to the drawings, 1 designates a garbage can cover, and 2 a handle therefor. In the top of this cover, at its center, is an opening 3 around the inner edge of which is fitted the larger end of an inverted cone-shaped member 4, which is preferably formed of fine wire netting or gauze. This member 4 is open at its smaller end to form a passageway for the ingress of flies. Directly beneath the member 4, and centrally thereof, is a shallow pan 6 the edge of which intersects the plane of the lower end of said cone shaped member 4. The pan is secured to a horizontally disposed bar 7, the latter being shown as supported at its ends by slotted plates 8 and 9 secured to the cover, the former plate being riveted only at one end so as to permit it to be moved to insert and remove the bar 7.

Within the pan 6 I place poison or fly paper which acts as an exterminating agency. The flies coming in through opening 3 must travel over the pan to reach the interior of the can, while those entering between the can and its cover will be attracted by the light from the opening 3 and in an effort to reach the lighted opening will come in contact with the poison on the pan 6, since the edge thereof intersects the plane of the lower end of the cone-shaped member.

I claim as my invention:

As an article of manufacture, a cover for refuse cans having an opening in its top, an inverted cone-shaped member secured to said cover in line with said opening, said cone-shaped member being itself open at its lower end to form a passageway, a dished poison container beneath and surrounding said lower opening, the edge of said poison container intersecting the plane of the lower end of said cone-shaped member, a support for said container, and plates secured to said cover for holding said support, one of said plates being flexible to removably hold the container and its support.

WILBERT T. KIRKMAN.

Witnesses:
W. A. KEENE,
JAMES G. COMBS.

---

Copies of this patent may be obtained for five cents each, by addressing the "Commissioner of Patents, Washington, D. C."